United States Patent
Zhao et al.

(10) Patent No.: US 11,579,575 B2
(45) Date of Patent: Feb. 14, 2023

(54) INVERSE REINFORCEMENT LEARNING WITH MODEL PREDICTIVE CONTROL

(71) Applicant: Baidu USA, LLC, Sunnyvale, CA (US)

(72) Inventors: Jinxin Zhao, Sunnyvale, CA (US); Liangjun Zhang, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 541 days.

(21) Appl. No.: 16/702,441

(22) Filed: Dec. 3, 2019

(65) Prior Publication Data
US 2021/0165375 A1 Jun. 3, 2021

(51) Int. Cl.
G05B 13/04 (2006.01)
G06N 3/084 (2023.01)
G05B 13/02 (2006.01)

(52) U.S. Cl.
CPC ......... *G05B 13/048* (2013.01); *G05B 13/027* (2013.01); *G06N 3/084* (2013.01)

(58) Field of Classification Search
CPC .... G05B 13/048; G05B 13/027; G05B 13/04; G06N 3/084; G06N 20/00; B60W 40/04; B60W 40/105
See application file for complete search history.

(56) References Cited

U.S. PATENT DOCUMENTS 9,454,733 B1 * 9/2016 Purpura ................. G06N 20/00
10,430,690 B1 * 10/2019 Chen .................... G06N 3/0454

OTHER PUBLICATIONS

Frasch et al.,"An auto-generated nonlinear mpc algorithm for real-time obstacle avoidance of ground vehicles," In 2013 European Control Con. (ECC), IEEE, 2013. ( 6pgs).

Rodriguez et al., "State of the art of finite control set model predictive control in power electronics," IEEE Transactions on Industrial Informatics, 2012. (2 pgs).

Arahal et al.,"Multi-phase current control using finite-state model-predictive control," Control Engineering Practice, 17(5):579-587, 2009. (9 pgs).

Y. LeCun,"Deep Learning," nature, 521(7553):436, 2015. (10pgs).

J. Schmidhuber,"Deep learning in neural networks: An overview," Neural networks, 61:85-117, 2015. (33 pgs).

D. A. Pomerleau,"Alvinn: An autonomous land vehicle in a neural network," In Advances in neural information processing systems, pp. 305-313, 1989. (9 pgs).

Xu et al.,"End-to-end learning of driving models from large-scale video datasets," arXiv preprint arXiv:1612.01079, 2017. (9pgs).

(Continued)

*Primary Examiner* — Jamal Javaid
(74) *Attorney, Agent, or Firm* — North Weber & Baugh LLP

(57) ABSTRACT

Described herein are systems and methods for inverse reinforcement learning to leverage the benefits of model-based optimization method and model-free learning method. Embodiments of a framework combining human behavior model with model predictive control are presented. The framework takes advantage of feature identification capability of a neural network to determine the reward function of model predictive control. Furthermore, embodiments of the present approach are implemented to solve the practical autonomous driving longitudinal control problem with simultaneous preference on safe execution and passenger comfort.

20 Claims, 7 Drawing Sheets

(56) References Cited

OTHER PUBLICATIONS

Abbeel et al.,"Apprenticeship learning via inverse reinforcement learning," In Proc. of the 21st intl. con. on Machine learning, p. 1. ACM, 2004. (8pgs).
Ng et al.,"Algorithms for inverse reinforcement learning," In Icml, vol. 1, p. 2, 2000. (8 pgs).
Zhifei et al.,"A review of inverse reinforcement learning theory and recent advances," In 2012 IEEE Congress on Evolutionary Computation, pp. 1-8. IEEE, 2012. (2 pgs).
Silver et al.,"Learning from demonstration for autonomous navigation in complex unstructured terrain," The Intl. Journal of Robotics Research, 29 (12):1565-1592, 2010. (32pgs).
Boyd et al.,"Convex optimization," Cambridge university press, 2004. (10 pgs).
US Department of Transportation, NGSIM—Next Generation Simulation, [online], [Retrieved Oct. 11, 2020]. Retrieved from Internet <URL:http://www.ngsim.fhwa.dot.gov> (1pg).
Kesting et al.,"Calibrating car-following models by using trajectory data: Methodological study," arXiv preprint arXiv:0803.4063, 2008. (17pgs).
D.D. Goldberg,"Genetic algorithms in search, optimization, and machine learning," IEEJ Transactions on Electronics, Information and Systems, 126(7):857-864, 2006. (6pgs).
Mayne et al.,"Constrained model predictive control: Stability and optimality," Automatica, 36(6):789-814, 2000. (26 pgs).
Qin et al.,"A survey of industrial model predictive control technology," Control Engineering Practice, 11(7):733-764, 2003. (32 pgs).
Vazquez et al.,"Model predictive control: A review of its applications in power electronics," IEEE Industrial Electronics Magazine, 8(1):16-31, 2014. (14 pgs).
Erez et al.,"An integrated system for real-time model predictive control of humanoid robots,"In 13th IEEE-RAS Intl Con. on Humanoid Robots (Humanoids), 2013. (8pgs).
Shim et al.,"Decentralized nonlinear model predictive control of multiple flying robots," In 42nd IEEE Intl. Con. on Decision & Control, pp. 3621-3626. IEEE, 2003. (6pgs).
Künhe et al.,"Mobile robot trajectory tracking using model predictive control," In II IEEE latin-american robotics symposium, vol. 51, 2005. (7pgs).
Schmied et al.,"Nonlinear MPC for emission efficient cooperative adaptive cruise control," IFAC—PapersOnLine, 48(23):160-165, 2015. (6 pgs).
Borrelli et al.,"An MPC/Hybrid system approach to traction control," IEEE Transactions on Control Systems Technology, 14(3):541-552, 2006. (13 pgs).
Borrelli et al.,"MPC-Based approach to active steering for autonomous vehicle systems," International Journal of Vehicle Autonomous Systems, 3(2):265-291, 2005. (25 pgs).
Falcone et al.,"Mpc-based yaw and lateral stabilisation via active front steering and braking," Vehicle System Dynamics, 46(S1):611-628, 2008. (1pg).

\* cited by examiner

700

INVERSE REINFORCEMENT LEARNING WITH MODEL PREDICTIVE CONTROL

BACKGROUND

A. Technical Field

The present disclosure relates generally to systems and methods for machine learning with improved performance, features, and uses.

B. Background

Selecting the most fruitful option by foreseeing the future, describes the nature of model predictive control (MPC). At each time instant, MPC aims to find the control input by solving an optimization problem. MPC has drawn enormous attention from both industrial and research perspectives. Industrial applications of MPC started from the field of chemical process control. Apart from industrial applications, MPC has also been an on-going topic in large amount of research projects. Real-time MPC scheme has been described for the control of humanoid robots, where MPC generates the trajectories for full body dynamics based on the received sub-tasks. With the surge of self-driving vehicle development in present-day, MPC is showing even more significance in such fields. Longitudinal control approaches have been described for adaptive cruise control and vehicle tractor control to improve the vehicle emission and fuel-consumption efficiency. Meanwhile active steering lateral vehicle controls focus on collision avoidance, which is made possible by MPC implementation with reasonable dynamic model for prediction Despite all the advantages and successful applications of MPC, it still suffers certain drawbacks like difficulty of choosing parameters and lack of adaptivity. During the implementation phase of MPC, selection of the parameters such as prediction horizon and optimization gains require lots of trial and error in either simulation or hardware in the loop (HIL) test. In addition, previously fine-tuned MPC controller in most cases does not adapt to the changes of the system. For example, variation of the plant (under-controlled) system parameters results in the state prediction model failing to provide meaningful prediction. Also, the change of the reference trajectory pattern, which may cause the predefined cost function not able to conclude a satisfactory tracking performance anymore. Moreover, in the field of autonomous driving, another issue of model-based method like MPC is that the generated behaviors do not always align with the expectation of a human, resulting into certain level of discomfort. The root cause is that the cost/reward functions are predefined and lack of variation.

Accordingly, what is needed are systems and methods for machine learning with MPC that can provide improved performance, features, and uses.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts a process for model training with inverse reinforcement learning of MPC according to embodiments of the present document.

DETAILED DESCRIPTION OF EMBODIMENTS

Figure 1:
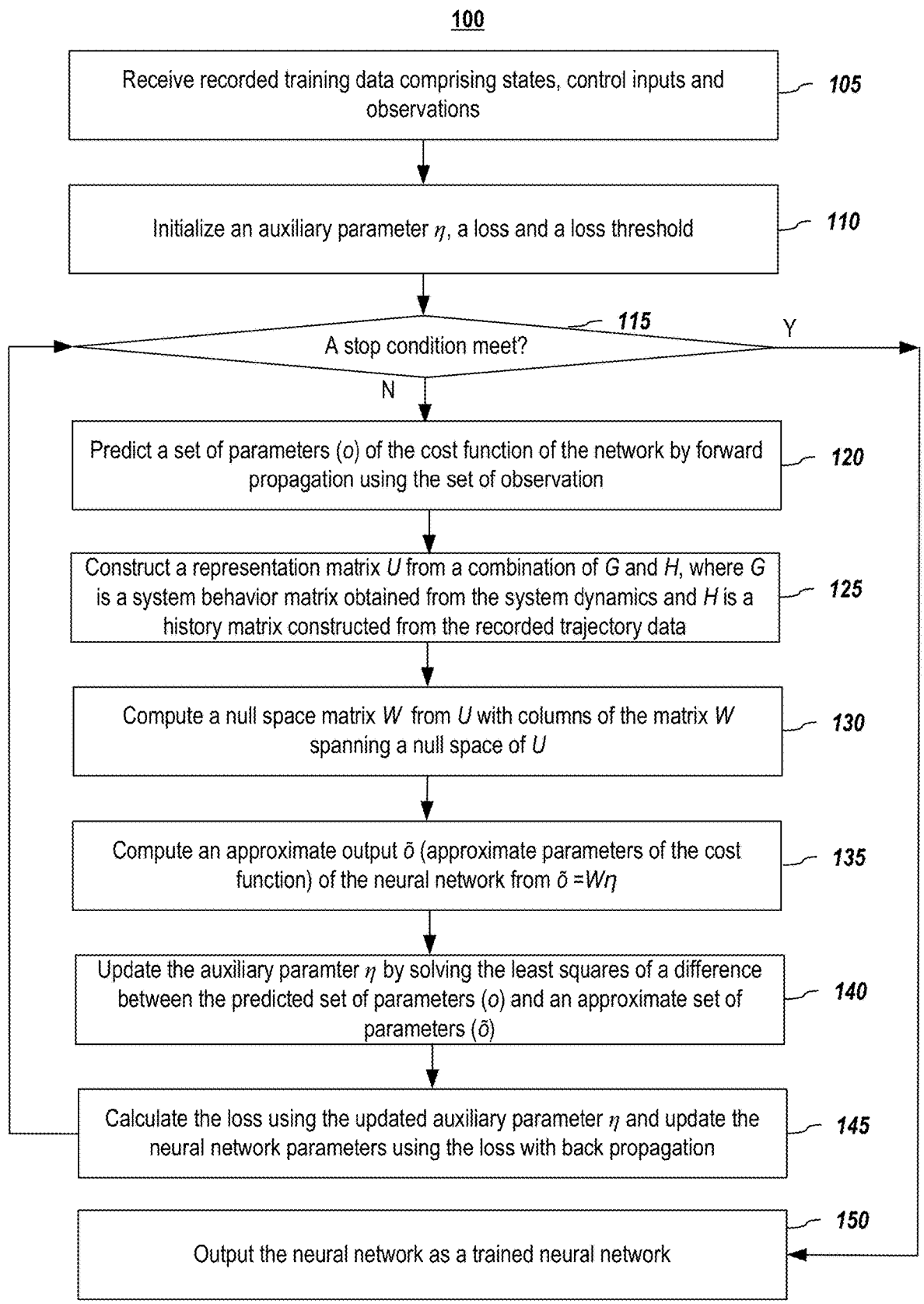

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. A "layer" may comprise one or more operations. The words "optimal," "optimize," "optimization," and the like refer to an improvement of an outcome or a process and do not require that the specified outcome or process has achieved an "optimal" or peak state.

The terms "include," "including," "comprise," and "comprising" shall be understood to be open terms and any lists the follow are examples and not meant to be limited to the listed items.

In one or more embodiments herein that include a stop condition, a stop condition may include one or more of the following: (1) a set number of iterations have been performed; (2) an amount of processing time has been reached; (3) convergence (e.g., the difference between consecutive iterations is less than a first threshold value); (4) divergence; and (5) an acceptable result has been reached.

Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Selecting the most fruitful option by foreseeing the future, describes the nature of model predictive control (MPC). At each time instant, MPC aims to find the control input by solving an optimization problem. This optimization considers the costs/rewards of the future steps and the prediction may be achieved by exploiting a state-space model. MPC has drawn enormous attention from both industrial and research perspectives. Industrial applications of MPC started from the field of chemical process control. In decades, many companies like Shell, Honeywell have been developing MPC packages for industrial uses. Nowadays successful implementations of MPC also include the area of power electronics with various topics including active front end (AFE), power converters connected to resistor-inductor (RL) loads. Apart from industrial applications, MPC has also been an on-going topic in large amount of research projects. Some described a real-time MPC scheme for the control of humanoid robots, where MPC generates the trajectories for full body dynamics based on the received sub-tasks. Aerial and ground mobile robotic researchers also implement MPC methods to resist the dynamic environment and confront the system constrains. Moreover, with the surge of self-driving vehicle development in present-day, MPC is showing even more significance in such fields. Some described longitudinal control approaches for adaptive cruise control and vehicle tractor control to improve the vehicle emission and fuel-consumption efficiency. Meanwhile active steering lateral vehicle controls focus on collision avoidance, which is made possible by MPC implementation with reasonable dynamic model for prediction.

Despite all the advantages and successful applications of MPC, it still suffers certain drawbacks like difficulty of choosing parameters and lack of adaptivity. During the implementation phase of MPC, selection of the parameters such as prediction horizon and optimization gains require lots of trial and error in either simulation or hardware in the loop (HIL) test. In addition, previously fine-tuned MPC controller in most cases does not adapt to the changes of the system. For example, variation of plant (under-controlled) system parameters results in a state prediction model failing to provide meaningful prediction. Also, the change of a reference trajectory pattern, which may cause the predefined cost function not able to conclude a satisfactory tracking performance anymore. Moreover, in the field of autonomous driving, another issue of model-based method like MPC is that generated behaviors do not always align with the expectation of a human, resulting into certain level of discomfort. The root cause is that the cost/reward functions are predefined and lack of variation.

B. Related Work

One option to overcome such issues is to exploit finite state machine (FSM) with MPC to update the prediction model or cost function parameters. However, such simple approach of combining several sets of parameters, does not avoid tremendous amount of labor of parameters tuning and still requires delicately manual design of states and transitions. On the other hand, deep learning techniques have shown enormous potential in the fields such as object detection, prediction and classification. One active research topic of utilizing capability of deep learning techniques for building self-driving vehicles is end-to-end driving. However, such methods may suffer oscillating control input signals and are not friendly for real-life implementations.

On the other hand, utilizing the identification capacity of data driven method to complete the model-based optimization method provides another viable perspective. Similar idea was investigated within the topic of inverse reinforcement learning (IRL), which aims to recover the cost function by observing a desired system trajectory or policy. Whereas most problems formulated in the contexts of IRL are finite-state Markov decision process (MDP) with Bayesian probability state transition model, MPC method in most case deals with continuous state space systems. Some has presented an interesting result where a behavior model, which translates state features (observation) to cost functions, learnt from demonstration.

In the present patent disclosure, embodiments of a framework are proposed for combining neural network (NN) model with MPC method, where the NN is pre-trained to recover the cost function for MPC, with respect to the observation of the environment. One major challenge of such method is the under-determination, where the observation does not provide enough bijective mapping from observation to label. Another major challenge is that a behavior model with zero parameters also satisfies the optimality condition with observation data, which has to be avoided in order to provide meaningful cost/reward function. Autonomous vehicle longitudinal control problem could largely benefit from the propose framework by learning the human-intended behavior. A demonstration is provided for solving such problem with embodiments of the proposed method.

C. Embodiments of Inverse Reinforcement Learning of MPC

1. Problem Formulation

In one or more embodiments, the problem of inverse reinforcement learning is formulated for a system with MPC framework. Model predictive control generates the control input for the plant (under-controlled) system by solving an optimization problem. This process may be repeated at each time instance and the first element of the obtained control sequence is provided to the system. Compared with the classic feedback control law, the main advantages of MPC is bi-fold. One is that the MPC control input is searched from more general space instead of just the linear combination of the state errors in classical control, another one the is that the future system states and references are also considered rather that only considering the current state and the current reference signal.

A MPC method is commonly formulated as follows, providing the current state is $x_k$ and prediction horizon is N, $$\underset{u_{k:k+N-1}}{\text{minimize}} \sum_{i=k}^{k+N-1} C_\theta(x_i, u_i) + F(x_{k+N}) \quad (1)$$
$$\text{subject to } x_{i+1} = f(x_i, u_i)$$
$$\underline{u} \le u_i \le \overline{u}$$

where $x_i \in \mathbb{R}^n$; $u_i \in \mathbb{R}^m$ and is within a span between lower a threshold $\underline{u}$ and an upper threshold $\overline{u}$; $C_\theta$ is a cost function and $\theta$ represents the function parameters; F represents a final state of the cost function; $f$ is a function for generating the next step of system states $x_{i+1}$ given current system states $x_i$ and current control input $u_1$.

In the present patent disclosure, embodiments of a novel framework making use of neural network are disclosed to predict an appropriate cost function for the MPC method, i.e., $$C_\theta = g_\psi(y_k) \quad (2)$$

where $y_k$ is the observed information at step k. In one or more embodiments, $y_k$ may be $x_k$, $u_k$, or $x_k$ with additional information observed.

As mentioned above, the benefit of such architect is that the neural network model is capable of provide suitable and various cost functions according to the observation of the environment. However, it also introduces the difficulty for the training process. One objective is to train this neural network model with favorable recorded trajectories, so that the entire method is capable of generating desired behavior while guaranteeing optimality in later use. The problem may be formulated as follows.

Problem 1 Given the MPC method described in (1) and the neural network structure in (2), design the training process with pre-recorded desired trajectories so that the cost function may be reconstructed and the output of the method shares similar behavior with compared with the recorded trajectory.

2. Approach Embodiments

In a normal imitation learning problem, the recorded data may explicitly provide the corresponding relation between the input/observation and output/label of a model. However, this is not the case for Problem 1, since the direct outputs of the MPC cost function $C_\theta$ may not be explicitly known or recorded.

The present disclosure provides solutions to Problem 1 by presenting how to enable model training process through recorded trajectory data. Embodiments of the present disclosure involve exploiting the Karush-Kuhn-Tucker (KKT) condition, so that a bijective mapping between observations and labels may be constructed.

In one or more embodiments, consider the MPC system configuration in equation (1), the cost function may be further restricted to have a quadratic form and omit the final state cost function $F(\cdot)$, $$C_\theta(x_i, u_i) = \tfrac{1}{2}(x_i^T Q_k x_i + u_i^T R_k u_i) \quad (3)$$

Following this format, the output of the neural network may be the matrices $Q_1$ and $R_i$, that is:

$$\theta = (Q_k, R_k) = g_\psi(y_k), \quad (4)$$

where represents the parameters of the neural network $g_\psi(\cdot)$. Along the dimension of time, the system under control physically locates at step k, and the cost function parameters $(Q_k, R_k)$ remain constant for the prediction steps i (which refer to all the steps of k+1, k+2, till k+N−1) in equation (1). After the control input is generated and applied to the actual system and the actual system proceeds to step k+1, the cost function parameters will then re-adjust and the optimization problem will be solved again for step k+1.

Now, the original Problem 1 has been further concretized that it may be necessary to introduce a mechanism of using neural network to predict the parameters $(Q_k, R_k)$ of cost function based on the observation sequence $y_k$. Given the observed samples of data sequence, the goal is to train a neural network such that it varies the MPC cost function parameters according to the observation to imitate the behavior encoded inside the data. Here it may be assumed that the hard constraint is not active, which means the inequality constraint has been satisfied before applying it. In one or more embodiments, considering the optimization described in (1) with cost function defined in (3), the Lagrangian may be written as:

$$L(X, U, \lambda) = \frac{1}{2} \sum_{i=k}^{k+N-1} \left( x_i^T Q_k x_i + u_i^T R_k u_i \right) + \lambda^T(k) F(X, U) \quad (5)$$

where the variables are defined as follows, $X = \text{col}(x_k, x_{k+1}, \ldots, x_{k+N-1}), U = \text{col}(u_k, u_{k+1}, \ldots, u_{k+N-1})$ $\lambda(k) = \text{col}(\lambda_0(k), \lambda_1(k), \ldots, \lambda_{N-1}(k))$, and $\lambda_i(k) \in \mathbb{R}^n$ $F(X,U) = \text{col}(f(x_k, u_k) - x_{k+1}, \ldots, f(x_{k+N-1}, u_{k+N-1}) - x_{k+N})$ In one or more embodiments, the necessary and sufficient conditions for optimality of solution to the problem (1) is the KKT-conditions defined as follows:

$$\frac{\partial L}{\partial X} = QX + \frac{\partial F^T(X, U)}{\partial X} \lambda(k) = 0, \quad (6)$$
$$\frac{\partial L}{\partial U} = RU + \frac{\partial F^T(X, U)}{\partial U} \lambda(k) = 0,$$

where $Q = \text{diag}(Q_k, Q_k, \ldots, Q_k)$, $R = \text{diag}(R_k, R_k, \ldots, R_k)$, and $\lambda(k)$ are language multiplier.

Upon solving the MPC optimization problem at each time instant, a sequence of control inputs may be generated, wherein, in one or more embodiments, only the first one is actually fed to and executed by the system. Hence in the recorded trajectory, each control input data point represents the first element of the solution to the optimization problem (1) at each time step.

Suppose $\tilde{X} = \text{col}(\tilde{x}_0, \tilde{x}_1, \ldots, \tilde{x}_l)$ is the recorded sequence of the system trajectories and $\tilde{U} = \text{col}(\tilde{u}_0, \tilde{u}_1, \ldots, \tilde{u}_l)$ is the recorded sequence of the recorded system control inputs. Assuming those recorded trajectories are generated through a MPC solver, then each data pair should satisfy the following condition:

$$Q_k \tilde{x}_k + \frac{\partial f^T(x,u)}{\partial x}\bigg|_{x=\tilde{x}_k, u=\tilde{u}_k} \lambda_0(k) = 0 \quad (7)$$

$$R_k \tilde{u}_k + \frac{\partial f^T(x,u)}{\partial u}\bigg|_{x=\tilde{x}_k, u=\tilde{u}_k} \lambda_0(k) = 0$$

At this point, the first challenge of solving problem 1 may be seen. Even given known system dynamics $f(x, u)$, one data pair $(\tilde{x}_k, \tilde{u}_k)$ is not enough to recover the matrices of $Q_k$ and $R_k$.

In one or more embodiments, the form of the matrices $Q_k$ and $R_k$ are further restricted to be diagonal, which means $Q_k = \text{diag}(q_k)$, $R_k = \text{diag}(r_k)$.

where $\text{col}(q, r)$ should be generated by the prediction neural network model. The diagonal form of these matrices may be used in MPC applications. Thus the neural network model may be represented as $$\text{col}(q_k, r_k) = g_\psi(\tilde{y}_k).$$

3. Embodiments of Model Training

In one or more embodiments, given a sequence of data pairs $((\tilde{y}_1, \tilde{x}_1, \tilde{u}_1), (\tilde{y}_2, \tilde{x}_2, \tilde{u}_2), \ldots, (\tilde{y}_l, \tilde{x}_l, \tilde{u}_l))$, towards satisfying the optimality condition described in equation (7) (e.g. assuming that the observed sequence is optimal), the loss function $\mathcal{L}$ may be chosen as:

$$\mathcal{L} = \sum_{k=0}^{l} J(\lambda_0(k)^*), \lambda_0(k)^* = \text{argmin}\, J(\lambda_0(k)), \quad (8)$$

$$J(\lambda_0(k)) = \|G\lambda_0(k) + H\text{col}(q_k, r_k)\|$$

where the matrices $G$ and $H$ may be defined as:

$$G = \begin{bmatrix} \frac{\partial f^T}{\partial x}\big|_{x=\tilde{x}_k, u=\tilde{u}_k} \\ \frac{\partial f^T}{\partial u}\big|_{x=\tilde{x}_k, u=\tilde{u}_k} \end{bmatrix}$$

$$H = \text{diag}(\tilde{x}_k, \tilde{u}_k).$$

In one or more embodiments, matrix $G$ is a system behavior matrix, which may be obtained from the system dynamics, and matrix $H$ is a history matrix, which may be constructed from the recorded trajectory data. In one or more embodiments, the history matrix $H$ is a block-diagonal matrix augmented from $\tilde{x}_k$ and $\tilde{u}_k$. In one or more embodiments, the system dynamics in defining the matrix $G$ is referred as the first partial order derivatives of the function $f$ with respect to system states $x$ and control input $u$, where $f$ is a system dynamic function for generating the next step of system states $x_{i+1}$ given current system states $x_i$ and current control input $u_i$.

Here another challenge may be seen of solving the proposed problem, which is $\lambda_0(k)^*=0$, $\text{col}(q_k, r_k)=0$, is an optimal solution to the minimization problem in equation (8) but it is a trivial solution.

In one or more embodiments, to avoid the optimal solution being trapped at zero, the following procedures are introduced for updating the parameters $\psi$ of the neural network $g_\psi(\cdot)$. The term $J(\lambda_0(k))$ in the loss function in equation (8) may be re-written as:

$$J(\lambda_0(k)) = \|Uv\|, U=[G\ H], v=\text{col}(\lambda_0(k), q_k, r_k) \quad (9)$$

$U$ in equation (9) is a representation matrix combined from $G$ and $H$. The row dimension of $U$ is n+m and the column dimension of $U$ is 2n+m, where n is the dimension of system state space and m is the dimension of the system input space. From equation (9), it may be seen that as long as $v$ lies inside the null space of $U$, $J$ is minimized. Now let the columns of a matrix $W$ span the null space of $U$, i.e., $$\text{Null}(U) = \text{span}(w_1, w_2, \ldots) \quad (10)$$

where $w_1, w_2, \ldots$ are columns of matrix $W$. Hence, for any vector $\eta$, let $v=W\eta$, then $v$ is an optimal solution to the problem in equation (8).

In one or more embodiments, an expectation-maximization (EM) method may be exploited for the training process. FIG. 1 depicts a process for model training with inverse reinforcement learning of MPC, according to embodiments of the present document. A set of recorded training data comprising states $\tilde{X}$, control inputs $\tilde{U}$, and observations $\tilde{Y}$ are received (105). First of all, an auxiliary parameter $\eta$ and a loss $\mathcal{L}$ are initialized (110) respectively as $\eta=\eta_0$ and $\mathcal{L}=\mathcal{L}_0$, where $\eta_0$ and $\mathcal{L}_0$ may be pre-determined values. In responsive to a stop condition (e.g. $\mathcal{L}$ is no greater a predetermined loss threshold $\bar{\mathcal{L}}$) having not been reached (115), a set of steps are iterated. Given the known system dynamics $f$ and data pair $((\tilde{y}_1, \tilde{x}_1, \tilde{u}_1), (\tilde{y}_2, \tilde{x}_2, \tilde{u}_2), \ldots, (\tilde{y}_l, \tilde{x}_l, \tilde{u}_l))$, an output $o$ (predicted parameters of the cost function) of the neural network is obtained (120) by forward propagation ($o=g_\psi(\tilde{Y})$) using the set of observations $\tilde{Y}$, and a representation matrix $U$ is constructed (125) from a combination of $G$ and $H$, where matrix $G$ is a system behavior matrix which may be obtained from the system dynamics and matrix $H$ is a history matrix which may be constructed from the recorded trajectory data. A null space matrix $W$ is computed (130) from $U$ with columns of the matrix $W$ spanning a null space of $U$. An approximate output $\tilde{o}$ (approximate parameters of the cost function) of the neural network may be computed (135) from $\tilde{o}=W\eta$. Finally, the loss of the neural network may be computed from $$\mathcal{L} = \Sigma\|\tilde{o} - o\|, o = g_\psi(y_k) \quad (11)$$

Meanwhile, $\eta$ is updated (140) by minimize a difference (e.g., a least square difference: $\text{minimize}_\eta \|W\eta - o\|$) between the output $o$ and the approximate output $\tilde{o}$. The loss $\mathcal{L}$ is calculated (145) using (11) with the updated $\eta$ and back-propagated to update the parameters $g_\psi(\cdot)$ of the neural network.

In one or more embodiments, these steps are iterated until the neural network parameters converge or the stop condition is met. The stop condition may be referred as the loss is no greater than a loss threshold $\bar{\mathcal{L}}$, which may be an absolute value or a relative value, e.g. 10%. In responsive to the stop condition having been reached, the neural network is output (150) as a trained neural network. Summary of the methodology is illustrated in methodology 1, according to one or more embodiments of the present patent disclosure.

---

Methodology 1: Inverse Reinforcement Learning MPC

---

Input: $\tilde{X}$, $\tilde{U}$ and $\tilde{Y}$
Output: $g_\psi(\cdot)$
1  $\eta = \eta_0, \mathcal{L} = \mathcal{L}_0$ and, $\bar{\mathcal{L}}$;
2  While $\mathcal{L} > \bar{\mathcal{L}}$ do
3     forward propagation $o = g_\psi(\tilde{Y})$;
4     construct matrix U;
5     compute the null space matrix W;
6     update $\eta$ as $\eta = \text{minimize}_\eta \|W\eta - o\|$;
7     calculate the loss $\mathcal{L} = \Sigma\|W\eta - o\|$ with the updated $\eta$;

| Methodology 1: Inverse Reinforcement Learning MPC |
|---|
| 8    back propagation to update network parameters $g_\psi(\cdot)$ ;
9 end |

D. Embodiments for Autonomous Vehicle Longitudinal Control

In this section, an embodiment of the methodology disclosed herein is applied for the design of a longitudinal controller for autonomous vehicle. First, a data-set generated through simulation is used for training and then a publicly available data set is exploited for performance comparison.

1. Methodology Formulation

Model-based optimization methods, such as linear-quadratic-regulator (LQR) and MPC, are largely developed and deployed for autonomous longitudinal vehicle control. However, substantial amount of complaints are reported because of the inconsistency between the method generated behavior and human-expected behavior. One interesting example is how to approach a static vehicle stopping ahead of the plant (under-controlled) vehicle. Human driver may speed down far away and approach to the static vehicle at a lower speed; on the contrary, optimization based method usually commands the plant (under-controlled) vehicle to approach the static vehicle rather fast followed by a late braking to stop behind the static vehicle. The reason is that the cost function penalizes on the arrival time so that the vehicle travels as fast as possible to reduce the cost. Adjusting the cost function could be an option to improve the passenger experience, but manual parameters-tuning takes lots of effort and the same cost function may not necessarily improve the driving performance for every driving scenario.

On the other hands, scheme embodiments in the present patent disclosure aim to alleviate such drawback by imitating the behavior of human through a recorded data set in the training phase and reconstruct the cost function based on the observation later in the deployment phase.

In one or more embodiments, for such longitudinal control problem, the under-controlled autonomous vehicle is defined as "ego vehicle" and the vehicle in front is called as "leading vehicle". Furthermore, the states of the system and the system update function can be described as:

$$x_i = \begin{bmatrix} d_l - d_d \\ v_l - v_e \\ v_d - v_e \end{bmatrix}, x_{i+1} = Ax_i + Bu_i, \quad (12)$$

$$A = \begin{bmatrix} 1 & dt & 0 \\ 0 & 1 & 0 \\ 0 & 0 & 1 \end{bmatrix}, B = \begin{bmatrix} 0 \\ -dt \\ -dt \end{bmatrix};$$

where dt is the time step or sampling time of the system and the physical meanings of the variables are defined as $v_l \in \mathbb{R}$ represents the velocity of the leading vehicle; $v_e \in \mathbb{R}$ represents the velocity of the ego vehicle; $d_l \in \mathbb{R}$ represents the distance between ego vehicle and leading vehicle; $d_d \in \mathbb{R}$ represents a desired distance value between ego vehicle and leading vehicle; $v_d \in \mathbb{R}$ represents a desired speed of ego vehicle; $u_1 \in \mathbb{R}$ represents the acceleration of the ego vehicle, which is also the control command generated by the method.

As for the prediction model $g_\psi(y_k)$, in this example, the observation $y_k$ is chosen as the trajectory history of the previous 10 frames, i.e., $$y_k = \text{col}(x_k, x_{k-1}, \ldots, x_{k-9}). \quad (13)$$

Figure 2:
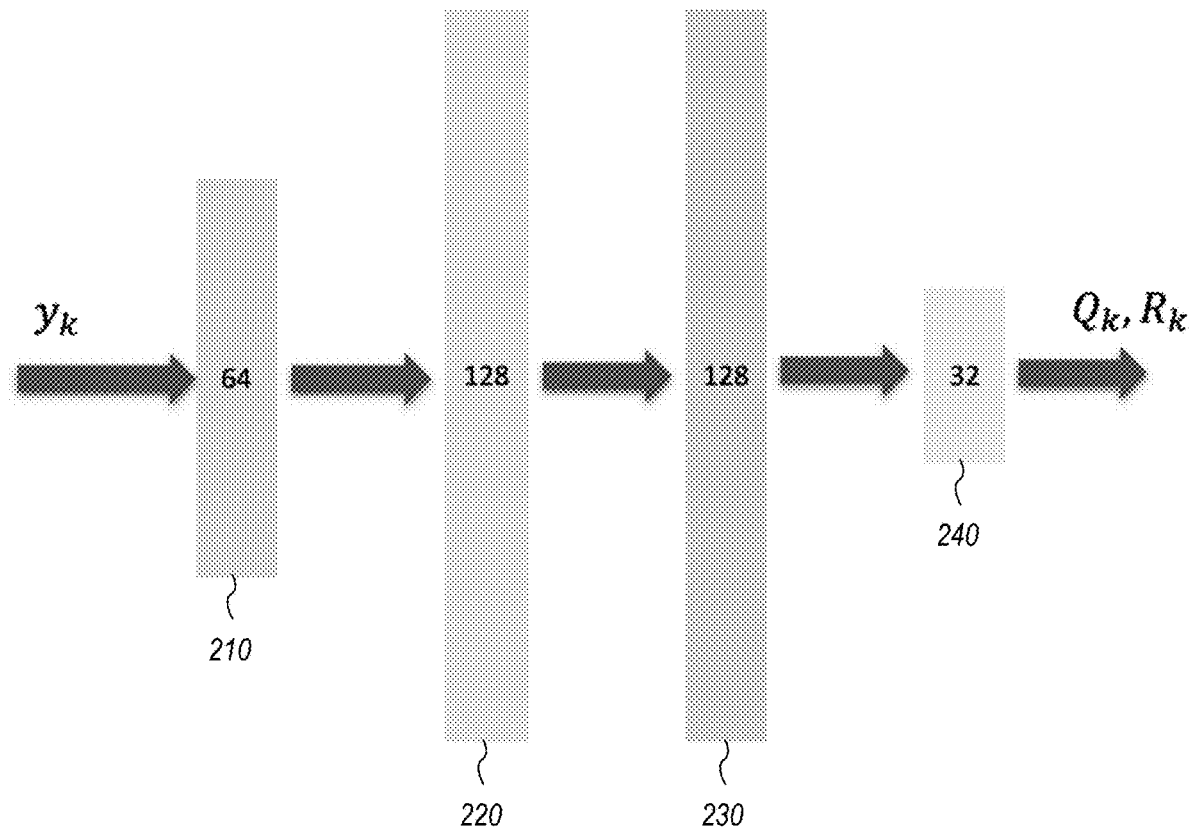
FIG. 2 depicts a neural network layout according to embodiments of the present document

In one or more embodiments, a four-layer fully connected neural network model 200 is used and is shown in FIG. 2 with number of nodes. The neural network receives observations $y_k$ and outputs parameters $(Q_k, R_k)$ of a cost function. The activation functions are chosen as tan h(·) for the first three layers 210, 220, and 230, and sigmoid(·) for the last output layer 240 to guarantee that $Q_k$ and $R_k$ are positive semi-definite. In one or more embodiments, the model is trained with batch size of 100 and learning rate of 1e−4. The size of the training data varies between different experiments.

2. Some Simulation Results

In this section, the training data is generated through a simulation. The simulation scenario is defined as follows. The leading vehicle is first placed 50 meters ahead of the ego vehicle with a speed of 20 m/s. Then at the time t=100 s, the leading vehicle is switched to another one located 40 meters ahead of the ego but with slower speed 15 m/s. Again at time t=200 s, the leading vehicle changes to one only 20 meters ahead with a speed 18 m/s. During the human driving data generation period, the leading vehicle speed deviates from the initial speed by a normal distribution. The ego vehicle starts with a speed of 25 m/s.

Figure 3:
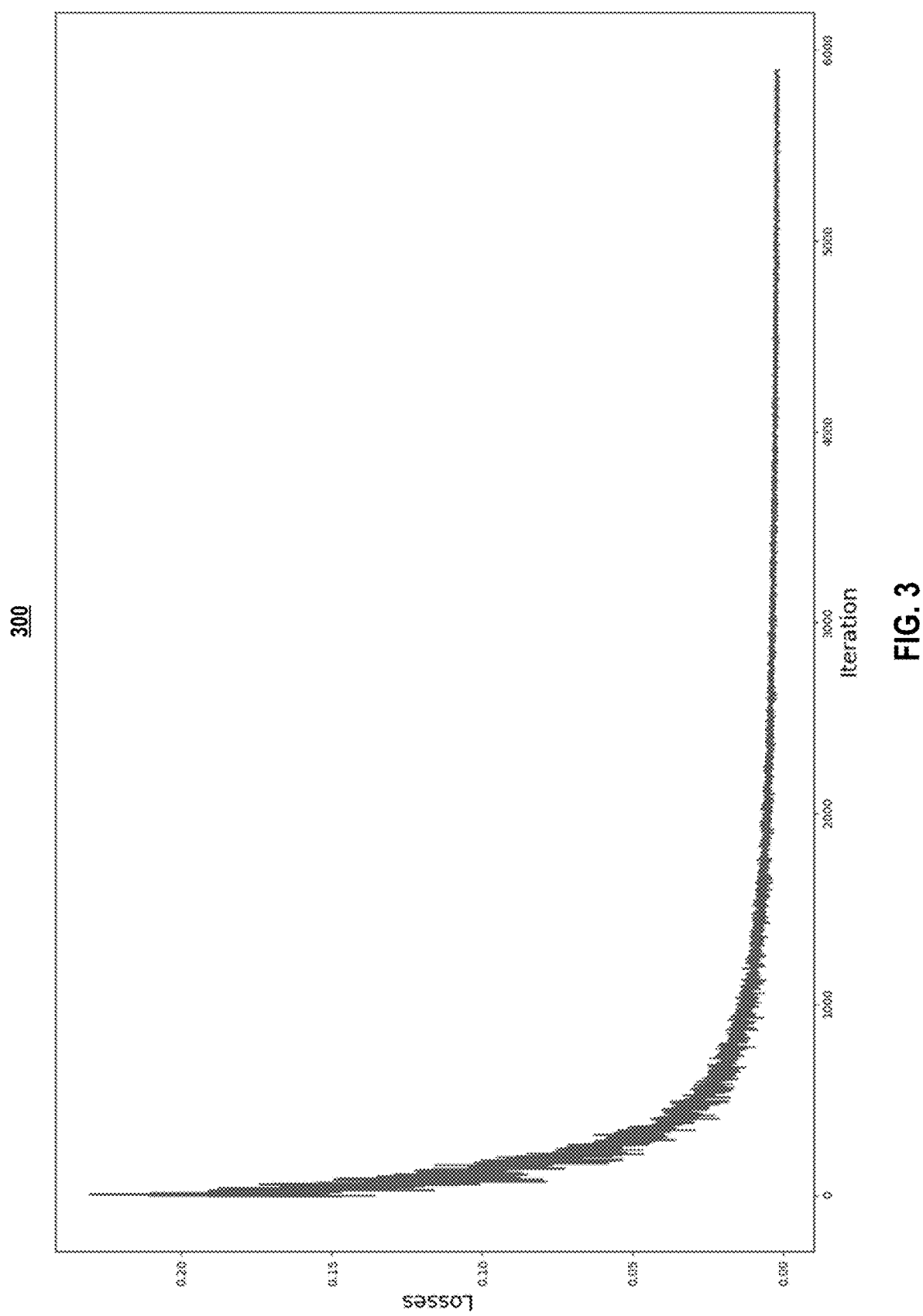
FIG. 3 depicts a loss history during training phase in a simulation according to embodiments of the present document.
Figure 4:
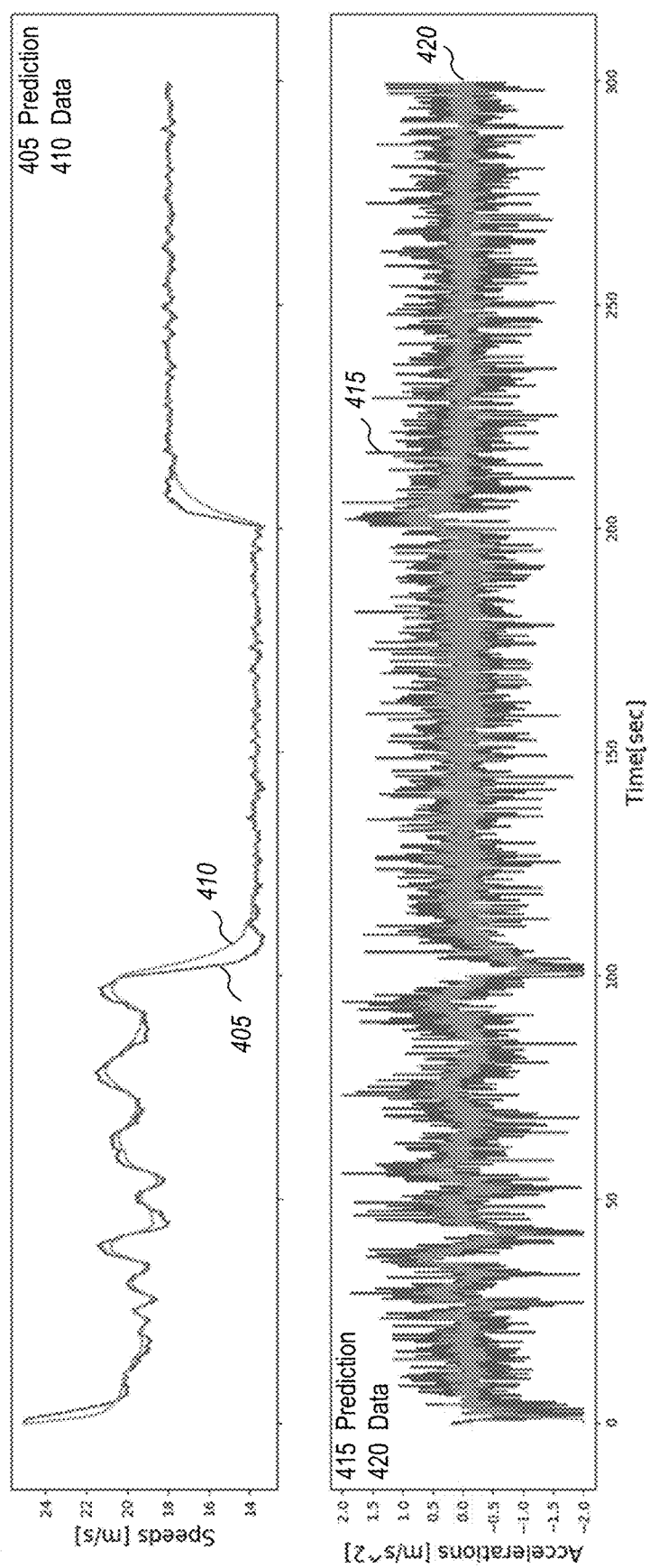
FIG. 4 depicts results comparison between simulated data and method generated command according to embodiments of the present document.

FIG. 3 depicts a loss history during training phase in a simulation and FIG. 4 depicts result comparison between simulated data and method-generated command. From the history of the loss $\mathcal{L}$ shown in FIG. 3, it may be seen that the parameters actually converge with a rather fast rate. The performance of the method embodiments is demonstrated through another simulation, where the constant MPC controller is replaced by a method embodiment in the present patent disclosure. The comparison of the recorded and generated ego vehicle acceleration is shown in FIG. 4, where line 405 and line 410 show the speed comparison; line 415 and line 420 show the acceleration command comparison. When confronting a similar scenario, one or more embodiments of the disclosed methodology are able to generate similar behavior with respect to the recorded trajectory.

3. Real-World Data Validation

To further demonstrate the methodology, several data sets extracted from Next Generation Simulation (NGSIM) data set were used. In the NGSIM project, detailed vehicle trajectory data is collected using camera devices at specific locations including southbound US 101 and Landershim Boulevard, Los Angeles, Calif., eastbound I-80 in Emeryville, Calif. and Peachtree Street in Atlanta, Ga. Each trajectory provides the information of precise locations, speeds and relative distances of a vehicle with a time resolution of 0.1 second.

Figure 5:
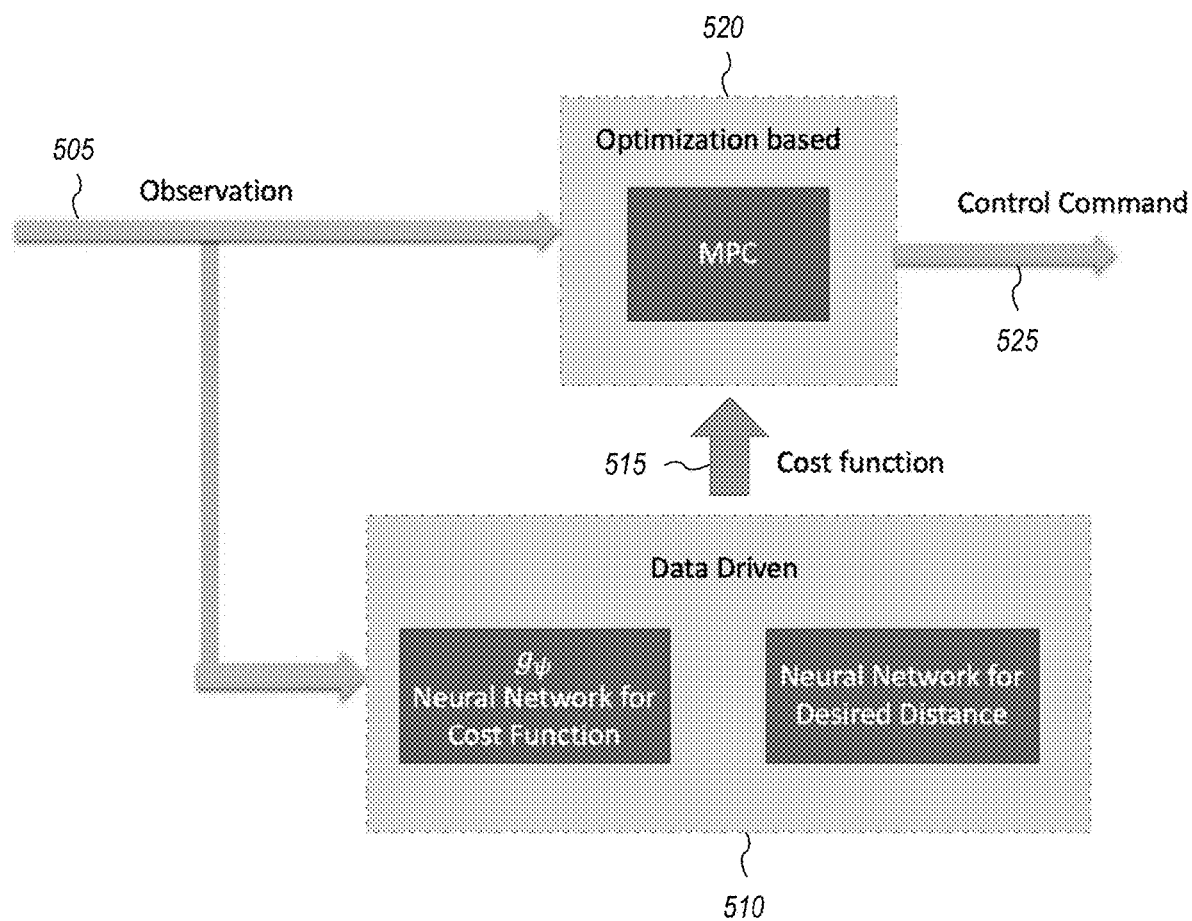
FIG. 5 depicts a methodology scheme for real-word data according to embodiments of the present document.

In one or more validation settings, 7 datasets were extracted from NGSIM data for the evaluation of the proposed methodology. The training process may be similar to the simulation data case. However, the desired distance $d_d$ is not explicitly known from the dataset, thus another prediction model is trained simultaneously for this value during the training process. To examine the method performance later, the sequences of the leading vehicle speeds and locations were reconstructed through the recorded data. A simulation was run by placing the ego vehicle at the same initial position, while it was fully controlled via embodiments of a control methodology. The scheme of the implemented method is shown in FIG. 5. A neural network 510 receives a set of observations 505 and outputs optimized cost function parameters 515 to an MPC module 520 such that the MPC module generates a control command 525 based on the observations 505 of environment and the cost function parameters 515. In one or more embodiments, the cost function parameters 515 are optimized with consideration of a desired vehicle distance, e.g., between the leading vehicle and the ego vehicle.

Figure 6:
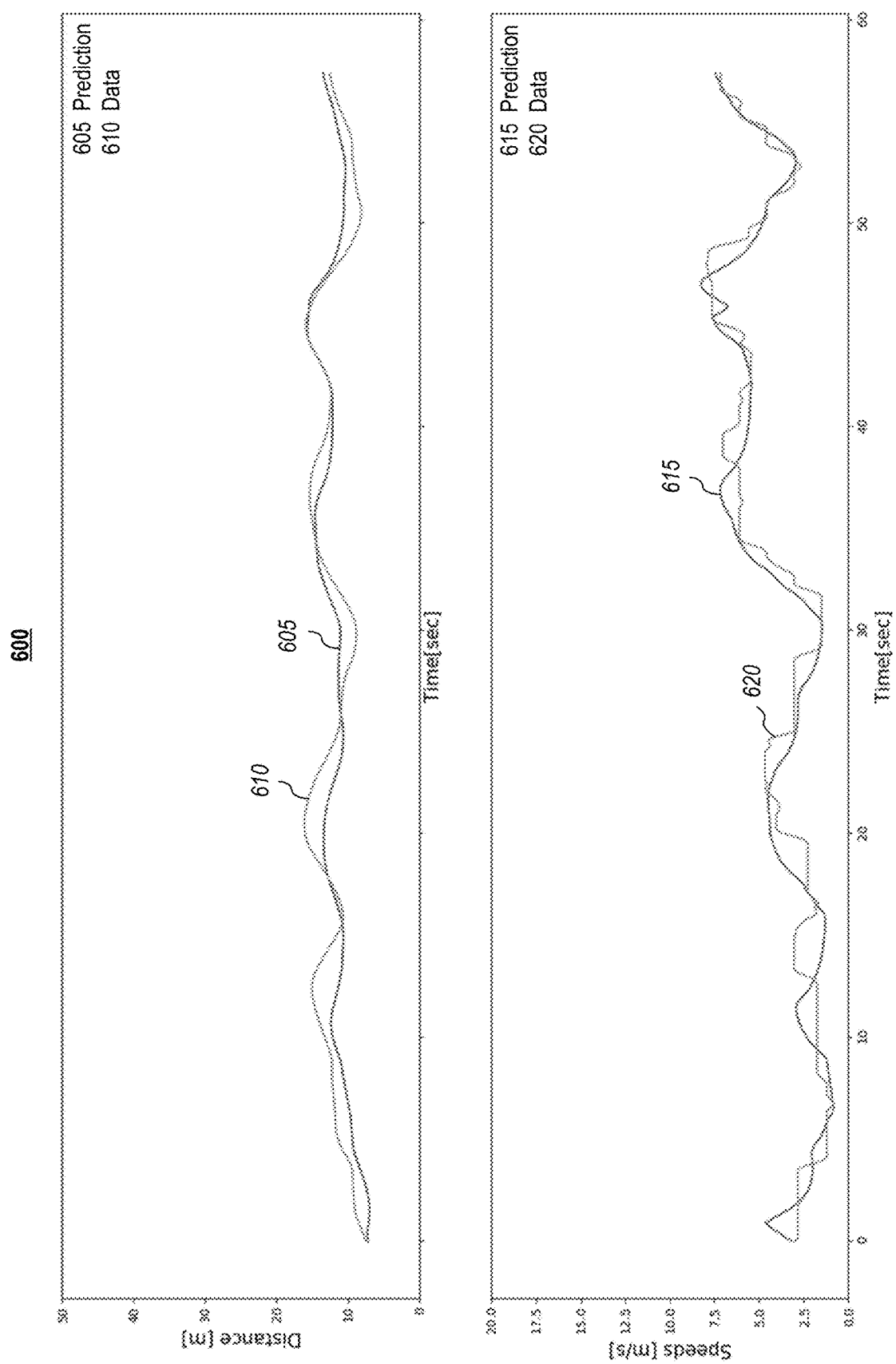
FIG. 6 depicts sample result comparison according to embodiments of the present document.

In FIG. 6, an example of the comparison between recorded data and simulation data is shown, where the simulated vehicle distance 605 and the simulated vehicle speed 615 are respectively close to the distance 610 and speed 620 in the recorded data.

In one or more validation settings, the benchmark results in Kesting and Treiber (Calibrating car-following models by using trajectory data: Methodological study. Transportation Research Record, 2088(1):148-156, 2008) was chosen as the baseline method, which investigates two popular car-following model, Intelligent Driver Model (IDM) and Velocity Difference Model (VDIFF). The IDM may be described mathematically as:

$$\dot{v}_{IDM}(s, v, \Delta v) = a\left[1 - (\frac{v}{v_0})^4 - (\frac{s^*(v, \Delta v)}{s})^2\right], \quad (14)$$

$$s^*(v, \Delta v) = s_0 + vT + \frac{v\Delta v}{2\sqrt{ab}} \quad (15)$$

Where v is the current vehicle velocity, $v_0$ is the desired velocity, $\Delta v$ is the velocity difference $v_0$ and v, s is the current distance to the preceding vehicle and s* is the desired distance; in this IDM model, a, b, $s_0$, $v_0$, T are parameters.

Meanwhile, the VDIFF model may be defined as:

$$\dot{v}_{DIFF}(s, v, \Delta v) = \frac{v_{opt}(s) - v}{\tau} - \lambda \Delta v, \quad (16)$$

$$v_{opt}(s) = \frac{v_0}{2}\left[\tanh(\frac{s}{l_{int}} - \beta) - \tanh(-\beta)\right], \quad (17)$$

Where definitions of v, s, $\Delta v$ are same as IDM model and $\tau$, $l_{int}$, $\beta$ are model parameters. In Kesting and Treiber, the models are calibrated by approximately solving the nonlinear optimization problem through a generic method. In this method, each new generation individual are generated by recombined two scholastically selected old generation individuals. This evolution terminates until convergence criterion reached.

In one or more validation settings, the same performance indicators, such as relative error and absolute error, are exploited as well to measure the similarity between the data as follows:

$$\mathcal{F}_{rel}(s) = \sqrt{\langle(\frac{s^{sim} - s^{data}}{s^{data}})^2\rangle} \quad (18)$$

$$\mathcal{F}_{abs}(s) = \sqrt{\frac{\langle(s^{sim} - s^{data})^2\rangle}{\langle s^{data}\rangle^2}}$$

where the symbol $\langle \cdot \rangle$ represents the mean of a data sequence and s represents the position data. In addition, absolute difference measurements are defined as follows, $$\varepsilon_{mean}(s) = \langle |s^{sim} - s^{data}| \rangle \quad \varepsilon_{var}(s) = \langle (s^{sim} - s^{data})^2 \rangle. \quad (19)$$

The performance evaluation results are shown in Table 1. For comparison, the result of Kesting and Treiber is shown in Table 2. In the baseline result relative error and absolute error ranges 20% to 30%, while results in Table 1 show around 10% less. Besides, Table 1 shows around 2 meters of position difference and less than 1 m/s speed difference between the recorded data and simulated trajectory.

TABLE 1

Performance Evaluation

| Dataset | $\mathcal{F}_{rel}$ (s) | $\mathcal{F}_{abs}$ (s) | $\varepsilon_{mean}$ (s) [m] | $\varepsilon_{var}$ (s) [m] | $\varepsilon_{mean}$ (v) [m/s] | $\varepsilon_{var}$ (v) [m/s] |
|---|---|---|---|---|---|---|
| 1 | 13.9% | 13.1% | 1.352 | 1.626 | 0.627 | 0.791 |
| 2 | 22.3% | 17.3% | 3.384 | 4.091 | 1.071 | 1.350 |
| 3 | 13.1% | 10.6% | 2.234 | 2.638 | 0.631 | 0.859 |
| 4 | 13.6% | 13.5% | 3.050 | 3.490 | 0.531 | 0.702 |
| 5 | 22.1% | 12.2% | 3.205 | 3.713 | 0.606 | 0.838 |
| 6 | 19.3% | 16.3% | 2.152 | 2.683 | 0.533 | 0.841 |
| 7 | 17.5% | 15.6% | 2.418 | 2.965 | 0.855 | 1.049 |

TABLE 2

Baseline Result

| | IDM | | VDIFF | |
|---|---|---|---|---|
| Dataset | $\mathcal{F}_{rel}$(s) | $\mathcal{F}_{abs}$(s) | $\mathcal{F}_{rel}$(s) | $\mathcal{F}_{abs}$(s) |
| 1 | 24.0% | 20.7% | 25.5% | 21.4% |
| 2 | 28.7% | 25.6% | 29.1% | 21.4% |
| 3 | 18.0% | 11.2% | 28.2% | 14.5% |

E. Some Conclusions

In the present patent disclosure, embodiments of a framework are disclosed for inverse reinforcement learning with MPC by combining the neural network prediction with MPC control methodology to imitate the behavior encoded inside a recorded data. A main challenge of such approach lies in the ambiguity of labeling and model parameters, where embodiments of the present patent disclosure approach the problem by building a bijective mapping between the recorded data and prediction model output. Optimization and dynamic model-based autonomous vehicle longitudinal control method nowadays suffers from the in-alignment with human intention. Whereas, the proposed method embodiments provide a solution. Implementation embodiments of such control method using the proposed method are presented. The result is compared with an existing approach and shows improved performance by reproducing similar behavior encoded within human-driven vehicle trajectory.

In one or more embodiments of the present disclosure, it is assumed that more than one or all generated control signals may be observed, in order to fully recover cost functions and constraints. In embodiments for autonomous driving application, feature extraction may be enhanced significantly to increase the similarity of driving style between a human driver and an autonomous vehicle. One approach is to provide more surrounding traffic information not limited to the leading vehicle, but also including local map information such as distances to lane boundaries and positions of the traffic intersections. One skilled in the art shall recognize that embodiments herein may be readily adapted or altered to make an autonomous vehicle drive more like human by feeding comparable observation as human receive when driving.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
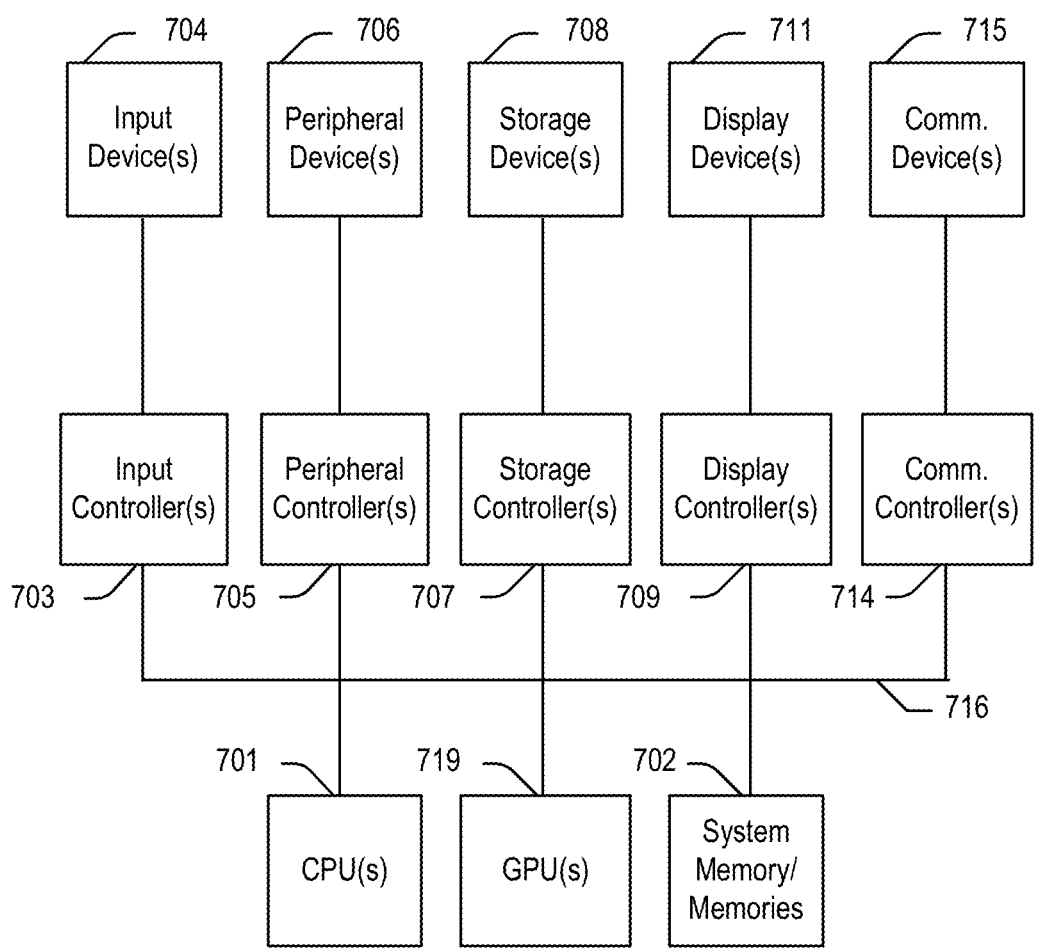
FIG. 7 depicts a simplified block diagram of a computing device/information handling system according to embodiments of the present document.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implement method for predicting parameters for a cost function by a neural network comprising:
    given a set of recorded training data comprising states, control inputs, and observations:
        responsive to a stop condition having not been reached, iterating a set of steps comprising:
            predicting, using the neural network and a set of observations from the set of recorded training data, a set of parameters for the cost function to be used by a model predictive control (MPC) process to predict a future control input for a system to achieve a desired behavior;
            computing a representation matrix according to dynamics of the system and the recorded training data;
            computing a null space matrix of the representation;
            updating an auxiliary parameter that, when multiplied by the null space matrix, produces an approximated set of parameters for the cost function, by minimizing a difference between the approximated set of parameters for the cost function and the predicted set of parameters for the cost function;
            using the updated auxiliary parameter to calculate a loss of the neural network; and
            updating parameters of the neural network using the loss by back propagation; and
        responsive to a stop condition having been reached, outputting the neural network as a trained neural network.

2. The computer-implement method of claim 1 wherein the null space matrix has columns spanning the null space of the representation matrix.

3. The computer-implement method of claim 1 wherein the representation matrix is a combination of a system behavior matrix and a history matrix, the system behavior matrix is constructed using dynamics of the system, recorded states and recorded current control inputs, the history matrix is constructed from the recorded states and control inputs.

4. The computer-implement method of claim 3 wherein the dynamics of the system are first order partial derivatives of a system dynamic function with respect to states and control inputs respectively, the system dynamic function generates a next step of states given current states and current control inputs of the system.

5. The computer-implement method of claim 3 wherein the history matrix is a block-diagonal matrix augmented from current states and current control inputs.

6. The computer-implement method of claim 1 wherein the stop condition is that the loss is no greater than a loss threshold.

7. The computer-implement method of claim 1 wherein the difference between the approximated set of parameters for the cost function and the predicted set of parameters for the cost function is a least square difference.

8. A system for model predictive control (MPC) using a neural network comprising:
    a neural network generating a cost function given an input of observations of environment, the neural network is pre-trained by:
        receiving a set of recorded training data comprising states, control inputs, and observations;
        initializing an auxiliary parameter and a loss for the neural network;
        responsive to a stop condition having not been reached, iterating a set of steps comprising:
            predicting, using the neural network and a set of observations from the set of recorded training data, a set of parameters for the cost function;
            computing a representation matrix according to dynamics of the system and the recorded training data;
            computing a null space matrix of the representation;
            updating the auxiliary parameter that, when multiplied by the null space matrix, produces an approximated set of parameters for the cost function, by minimizing a difference between the approximated set of parameters for the cost function and the predicted set of parameters for the cost function;
            using the updated auxiliary parameter to calculate a loss of the neural network; and
            updating parameters of the neural network using the loss by back propagation; and
        responsive to the stop condition having been reached, outputting the neural network as a trained neural network; and
    a MPC module coupled to the neural network, the MPC module generates a future control input for the system, based on the input of observations and the cost function, to achieve a desired behavior.

9. The system of claim 8 wherein the null space matrix has columns spanning the null space of the representation matrix.

10. The system of claim 8 wherein the representation matrix is a combination of a system behavior matrix and a history matrix, the system behavior matrix is constructed using dynamics of the system, recorded states and recorded current control inputs, the history matrix is constructed from the recorded states and control inputs.

11. The system of claim 8 wherein the dynamics of the system are first order partial derivatives of a system dynamic function with respect to states and control inputs respectively, the system dynamic function generates a next step of states given current states and current control inputs of the system.

12. The system of claim 10 wherein the history matrix is a block-diagonal matrix augmented from current states and current control inputs.

13. The system of claim 8 wherein the difference between the approximated set of parameters for the cost function and the predicted set of parameters for the cost function is a least square difference.

14. A non-transitory computer-readable medium or media comprising one or more sequences of instructions which, when executed by one or more processors, causes the steps for inverse reinforcement learning with model predictive control (MPC) to be performed comprising:

receiving a set of recorded training data comprising states, control inputs, and observations;

responsive to a stop condition having not been reached, iterating a set of steps comprising:

predicting, using a neural network and a set of observations from the set of recorded training data, a set of parameters for a cost function to be used by a model predictive control (MPC) process to predict a future control input for a system to achieve a desired behavior;

computing a representation matrix according to dynamics of the system and the recorded training data;

computing a null space matrix of the representation;

updating an auxiliary parameter that, when multiplied by the null space matrix, produces an approximated set of parameters for the cost function, by minimizing a difference between the approximated set of parameters for the cost function and the predicted set of parameters for the cost function;

using the updated auxiliary parameter to calculate a loss of the neural network; and updating parameters of the neural network using the loss by back propagation; and responsive to a stop condition having been reached, outputting the neural network as a trained neural network.

15. The non-transitory computer-readable medium or media of claim 14 wherein the null space matrix has columns spanning the null space of the representation matrix.

16. The non-transitory computer-readable medium or media of claim 14 wherein the representation matrix is a combination of a system behavior matrix and a history matrix, the system behavior matrix is constructed using dynamics of the system, recorded states and recorded current control inputs, the history matrix is constructed from the recorded states and control inputs.

17. The non-transitory computer-readable medium or media of claim 16 wherein the dynamics of the system are first order partial derivatives of a system dynamic function with respect to states and control inputs respectively, the system dynamic function generates a next step of states given current states and current control inputs of the system.

18. The non-transitory computer-readable medium or media of claim 16 wherein the history matrix is a block-diagonal matrix augmented from current states and current control inputs.

19. The non-transitory computer-readable medium or media of claim 14 wherein the stop condition is that the loss is no greater than a loss threshold.

20. The non-transitory computer-readable medium or media of claim 14 wherein the difference between the approximated set of parameters for the cost function and the predicted set of parameters for the cost function is a least square difference.

\* \* \* \* \*